(12) United States Patent
Steiss et al.

(10) Patent No.: US 6,766,440 B1
(45) Date of Patent: Jul. 20, 2004

(54) MICROPROCESSOR WITH CONDITIONAL CROSS PATH STALL TO MINIMIZE CPU CYCLE TIME LENGTH

(75) Inventors: Donald E. Steiss, Richardson, TX (US); David Hoyle, Glendale, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 545 days.

(21) Appl. No.: 09/702,453

(22) Filed: Oct. 31, 2000

Related U.S. Application Data (60) Provisional application No. 60/183,527, filed on Feb. 18, 2000.

(51) Int. Cl.[7] ................................................ G06F 9/30
(52) U.S. Cl. ...................................................... 712/218
(58) Field of Search ........................... 712/23, 24, 218, 712/216, 219

(56) References Cited

U.S. PATENT DOCUMENTS

| | | | | |
|---|---|---|---|---|
| 4,985,825 A | * | 1/1991 | Webb et al. ................. | 711/169 |
| 5,555,384 A | * | 9/1996 | Roberts et al. .............. | 712/216 |
| 5,838,986 A | * | 11/1998 | Garg et al. ................... | 712/23 |
| 5,860,000 A | * | 1/1999 | Biswas et al. ............... | 712/244 |
| 6,041,387 A | * | 3/2000 | Fleck et al. .................... | 711/5 |
| 6,137,836 A | * | 10/2000 | Haataja ................. | 375/240.08 |
| 6,289,433 B1 | * | 9/2001 | Garg et al. ................... | 712/23 |
| 6,301,653 B1 | * | 10/2001 | Mohamed et al. .......... | 712/214 |
| 6,308,252 B1 | * | 10/2001 | Agarwal et al. .............. | 712/22 |
| 6,360,315 B1 | * | 3/2002 | Potter .......................... | 712/219 |

* cited by examiner

*Primary Examiner*—Eddie Chan
*Assistant Examiner*—David J. Huisman
(74) *Attorney, Agent, or Firm*—Robert D. Marshall, Jr.; W. James Brady, III; Frederick J. Telecky, Jr.

(57) ABSTRACT

A digital system is provided that includes a central processing unit (CPU) that has an instruction execution pipeline with a plurality of functional units for executing instructions in a sequence of CPU cycles. The execution units are clustered into two or more groups. Cross-path circuitry is provided such that results from any execution unit in one execution unit cluster can be supplied to execution units in another cluster. A cross-path stall is conditionally inserted to stall all of the functional groups when one execution unit cluster requires an operand from another cluster on a given CPU cycle and the execution unit that is producing that operand completes the computation of that operand on an immediately preceding CPU cycle.

11 Claims, 5 Drawing Sheets

MICROPROCESSOR WITH CONDITIONAL CROSS PATH STALL TO MINIMIZE CPU CYCLE TIME LENGTH

This application claims priority under 35 USC §119(e)(1) of Provisional Application No. 60/183,527, filed Feb. 18, 2000.

NOTICE (C) Copyright Texas Instruments Incorporated. A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD OF THE INVENTION

This invention relates to data processing devices, electronic processing and control systems and methods of their manufacture and operation, and particularly relates to microprocessors optimized for digital signal processing.

BACKGROUND OF THE INVENTION

Generally, a microprocessor is a circuit that combines the instruction-handling, arithmetic, and logical operations of a computer on a single semiconductor integrated circuit. Microprocessors can be grouped into two general classes, namely general-purpose microprocessors and special-purpose microprocessors. General-purpose microprocessors are designed to be programmable by the user to perform any of a wide range of tasks, and are therefore often used as the central processing unit (CPU) in equipment such as personal computers. Special-purpose microprocessors, in contrast, are designed to provide performance improvement for specific predetermined arithmetic and logical functions for which the user intends to use the microprocessor. By knowing the primary function of the microprocessor, the designer can structure the microprocessor architecture in such a manner that the performance of the specific function by the special-purpose microprocessor greatly exceeds the performance of the same function by a general-purpose microprocessor regardless of the program implemented by the user.

One such function that can be performed by a special-purpose microprocessor at a greatly improved rate is digital signal processing. Digital signal processing generally involves the representation, transmission, and manipulation of signals, using numerical techniques and a type of special-purpose microprocessor known as a digital signal processor (DSP). Digital signal processing typically requires the manipulation of large volumes of data, and a digital signal processor is optimized to efficiently perform the intensive computation and memory access operations associated with this data manipulation. For example, computations for performing Fast Fourier Transforms (FFTs) and for implementing digital filters consist to a large degree of repetitive operations such as multiply-and-add and multiple-bit-shift. DSPs can be specifically adapted for these repetitive functions, and provide a substantial performance improvement over general-purpose microprocessors in, for example, real-time applications such as image and speech processing.

DSPs are central to the operation of many of today's electronic products, such as high-speed modems, high-density disk drives, digital cellular phones, complex automotive systems, and video-conferencing equipment. DSPs will enable a wide variety of other digital systems in the future, such as video-phones, network processing, natural speech interfaces, and ultra-high speed modems. The demands placed upon DSPs in these and other applications continue to grow as consumers seek increased performance from their digital products, and as the convergence of the communications, computer and consumer industries creates completely new digital products.

Digital systems are designed on a single integrated circuit referred to as an application specific integrated circuit (ASIC). MegaModules are being used in the design of ASICs to create complex digital systems a single chip. (MegaModule is a trademark of Texas Instruments Incorporated.) Types of MegaModules include SRAMs, FIFOs, register files, RAMs, ROMs, universal asynchronous receiver-transmitters (UARTs), programmable logic arrays and other such logic circuits. MegaModules are usually defined as integrated circuit modules of at least 500 gates in complexity and having a complex ASIC macro function. These MegaModules are predesigned and stored in an ASIC design library. The MegaModules can then be selected by a designer and placed within a certain area on a new IC chip.

Designers have succeeded in increasing the performance of DSPs, and microprocessors in general, by increasing clock speeds, by removing data processing bottlenecks in circuit architecture, by incorporating multiple execution units on a single processor circuit, and by developing optimizing compilers that schedule operations to be executed by the processor in an efficient manner. The increasing demands of technology and the marketplace make desirable even further structural and process improvements in processing devices, application systems and methods of operation and manufacture.

Microprocessor designers have increasingly endeavored to exploit parallelism to improve performance. One parallel architecture that has found application in some modern microprocessors utilizes multiple instruction fetch packets and multiple instruction execution packets with multiple functional units. However, sharing of data between multiple execution units can cause scheduling conflicts that reduce performance.

SUMMARY OF THE INVENTION

An illustrative embodiment of the present invention seeks to provide a microprocessor and a method for operating a microprocessor that improves digital signal processing performance. Aspects of the invention are specified in the claims.

In an embodiment of the present invention, a digital system includes a central processing unit (CPU) that has an instruction execution pipeline with a plurality of functional units for executing instructions in a sequence of CPU cycles. The execution units are clustered into two or more groups. Forwarding paths, referred to as cross-paths, are provided such that results from any execution unit in one execution unit cluster can be supplied to execution units in another cluster. One or more pipeline stalls are generated when one execution unit cluster requires an operand from another cluster and the execution unit that is producing that operand completes the computation on that operand but has not committed that operand to the register file.

In another embodiment of the present invention, a stall register is connected to receive operand data from the functional unit in parallel with the set of registers.

In another embodiment of the present invention, a plurality of stall registers are connected respectively to a plurality of functional units to receive operand data from each of the plurality of functional units in parallel with the set of registers.

In an embodiment of the present invention, a method of operating a CPU having an instruction execution pipeline with a plurality of functional units for executing instructions in a sequence of CPU cycles is provided. An operand may be accessed from a selected register of a first set of registers for use by a functional unit in another cluster associated with a second set of registers during a given CPU cycle. The instruction execution pipeline is stalled in response to accessing the selected register in the first register set by a functional unit in another cluster during the given CPU cycle if the selected register was updated by a first functional unit in the associated cluster during the immediately prior CPU cycle.

BRIEF DESCRIPTION OF THE DRAWINGS

Other features and advantages of the present invention will become apparent by reference to the following detailed description when considered in conjunction with the accompanying drawings, in which.

DETAILED DESCRIPTION OF EMBODIMENTS OF THE INVENTION

Figure 1:
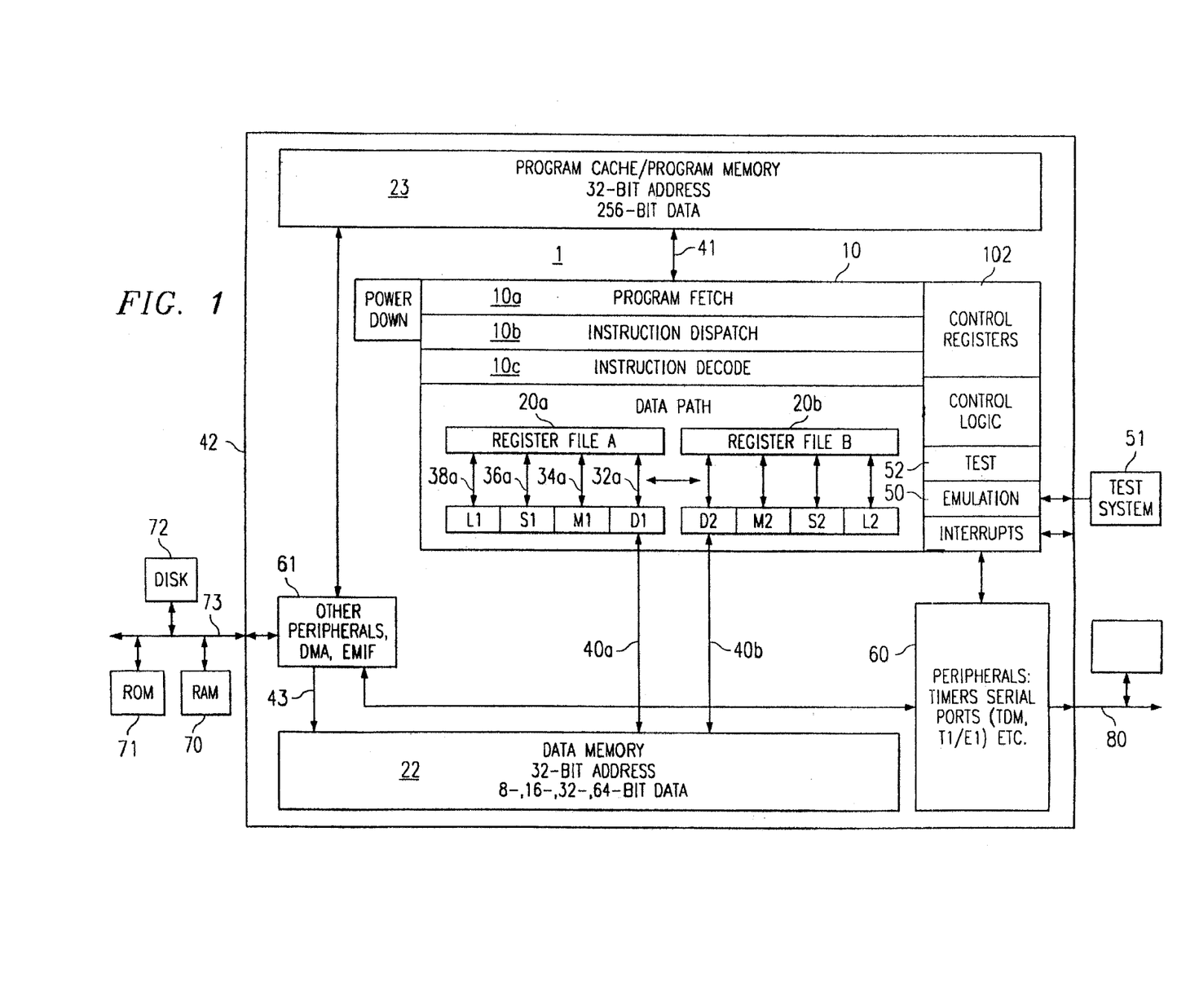
FIG. 1 is a block diagram of a digital signal processor (DSP), showing components thereof pertinent to an embodiment of the present invention.

FIG. 1 is a block diagram of a microprocessor 1 which has an embodiment of the present invention. Microprocessor 1 is a VLIW digital signal processor ("DSP"). In the interest of clarity, FIG. 1 only shows those portions of microprocessor 1 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 1 relevant to an embodiment of the present invention are explained in sufficient detail hereinbelow, so as to enable one of ordinary skill in the microprocessor art to make and use the invention.

In microprocessor 1 there are shown a central processing unit (CPU) 10, data memory 22, program memory 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multiport register file 20a from which data are read and to which data are written. Decoded instructions are provided from the instruction fetch/decode unit 10a–c to the functional units D1, M1, S1, and L1 over various sets of control lines which are not shown. Data are provided to/from the register file 20a from/to to load/store unit D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store unit D1 via a fifth set of busses 40a. The buses 40a include store bus DA1 from multiplexer 200a, store buses ST1a, ST1b and load buses LD1a, LD1b. Note that the entire data path described above is duplicated with register file 20b and execution units D2, M2, S2, and L2. Load/store unit D2 similarly interfaces with memory 22 via a set of busses 40b. The buses 40b include store bus DA2 from multiplexer 200b, store buses ST2a, ST2b and load buses LD2a, LD2b.

Instructions are fetched by fetch unit 10a from instruction memory 23 over a set of busses 41. In this embodiment, instructions are always fetched eight at a time. This constitutes a 256-bit fetch packet. The execution grouping of the fetch packet is specified by a p-bit (bit zero) of each instruction. The fetch packets are 8-word (32-bit words) aligned.

Emulation circuitry 50 provides access to the internal operation of integrated circuit 1 which can be controlled by an external test/development system (XDS) 51. External test system 51 is representative of a variety of known test systems for debugging and emulating integrated circuits. One such system is described in U.S. Pat. No. 5,535,331 which is incorporated herein by reference. Test circuitry 52 contains control registers and parallel signature analysis circuitry for testing integrated circuit 1.

Note that the memory 22 and memory 23 are shown in FIG. 1 to be a part of a microprocessor 1 integrated circuit, the extent of which is represented by the box 42. The memories 22–23 could just as well be external to the microprocessor 1 integrated circuit 42, or part of it could reside on the integrated circuit 42 and part of it be external to the integrated circuit 42. These are matters of design choice. Also, the particular selection and number of execution units are a matter of design choice, and are not critical to the invention.

When microprocessor 1 is incorporated in a data processing system, additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. Bus 73 is connected to the External Memory Interface (EMIF) which is part of functional block 61 within microprocessor 1. A Direct Memory Access (DMA) controller is also included within block 61. The DMA controller par of functional block 61 connects to data memory 22 via bus 43 and is generally used to move data between memory and peripherals within microprocessor 1 and memory and peripherals which are external to microprocessor 1.

A detailed description of various architectural features and a basic instruction set of CPU 10 is provided in coassigned U.S. Pat. No. 6,182,203 and is incorporated herein by reference. A description of enhanced architectural features and an extended instruction set not described herein for CPU 10 is provided in coassigned U.S. patent application Ser. No. 09/703,096 and is incorporated herein by reference.

Figure 2:
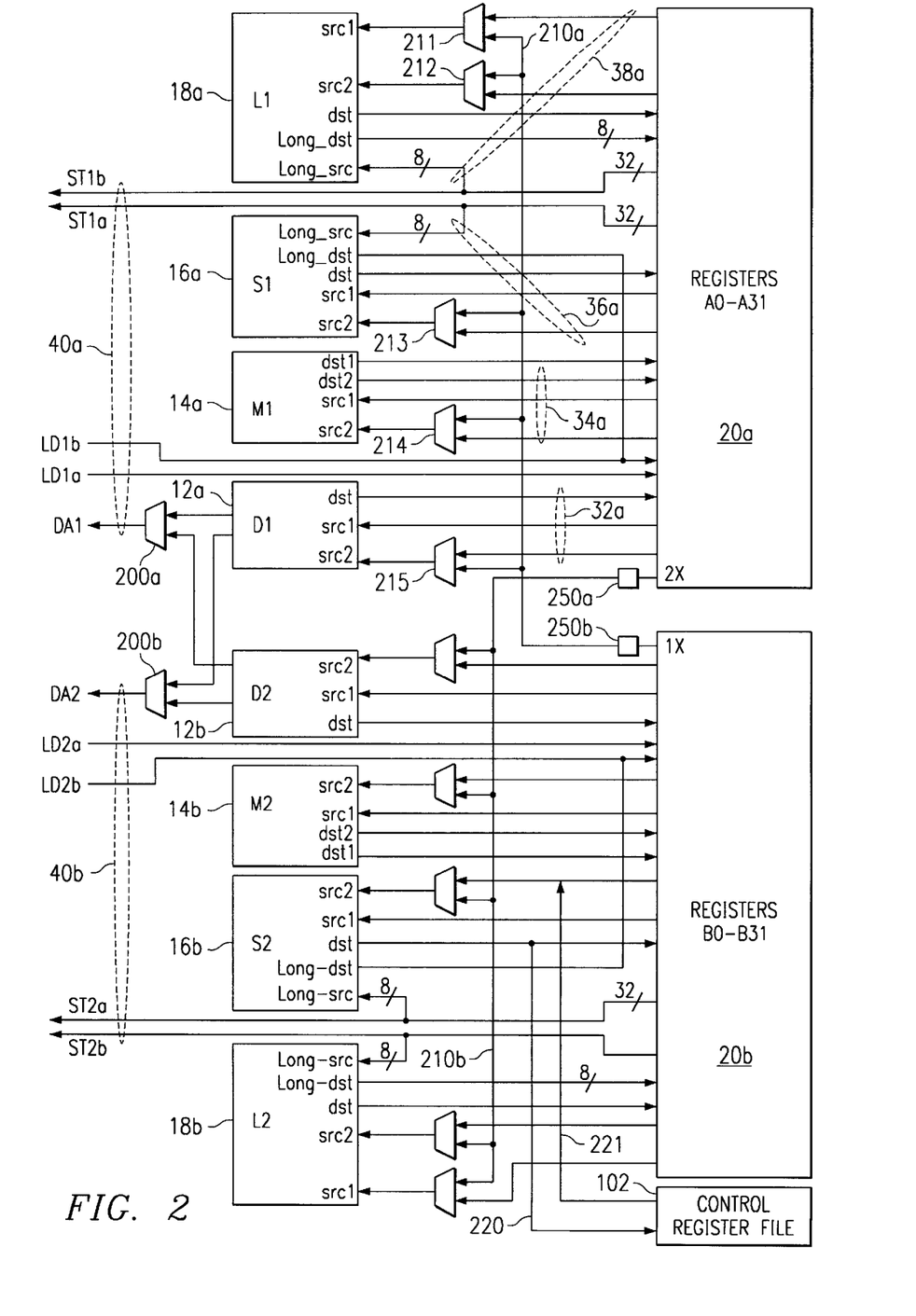
FIG. 2 is a block diagram of the functional units, data paths, register files, and cross-path circuitry of FIG. 1.

FIG. 2 is a block diagram of the execution units and register files of the microprocessor of FIG. 1 and shows a more detailed view of the buses connecting the various functional blocks. In this figure; all data busses are 32 bits wide, unless otherwise noted. There are two general-purpose register files (A and B) in the processor's data paths. Each of these files contains 32 32-bit registers (A0–A31 for register file A 20*a* and B0–B31 for register file B 20*b*). The general-purpose registers can be used for data, data address pointers, or condition registers. Any number of reads of a given register can be performed in a given cycle.

The general-purpose register files support data ranging in size from packed 8-bit data through 64-bit fixed-point data. Values larger than 32 bits, such as 40-bit long and 64-bit double word quantities, are stored in register pairs, with the 32 LSBs of data placed in an even-numbered register and the remaining 8 or 32 MSBs in the next upper register (which is always an odd-numbered register). Packed data types store either four 8-bit values or two 16-bit values in a single 32-bit register.

There are 32 valid register pairs for 40-bit and 64-bit data, as shown in Table 1. In assembly language syntax, a colon between the register names denotes the register pairs and the odd numbered register is specified first. Operations requiring a long input ignore the 24 MSBs of the odd register. Operations producing a long result zero-fill the 24 MSBs of the odd register. The even register is encoded in the opcode.

TABLE 1

| 40-Bit/64-Bit Register Pairs Register Files | |
|---|---|
| A | B |
| A1:A0 | B1:B0 |
| A3:A2 | B3:B2 |
| A5:A4 | B5:B4 |
| A7:A6 | B7:B6 |
| A9:A8 | B9:B8 |
| A11:A10 | B11:B10 |
| A13:A12 | B13:B12 |
| A15:A14 | B15:B14 |
| A17:A16 | B17:B16 |
| A19:A18 | B19:B18 |
| A21:A20 | B21:B20 |
| A23:A22 | B23:B22 |
| A25:A24 | B25:B24 |
| A27:A26 | B27:B26 |
| A29:A28 | B29:B28 |
| A31:A30 | B31:B30 |

Referring again to FIG. 2, the eight functional units in processor 10's data paths can be divided into two groups, or clusters, of four; each functional unit in one data path is almost identical to the corresponding unit in the other data path. The functional units are described in Table 2.

TABLE 2

Functional Units and Operations Performed

| Functional Unit | Fixed-Point Operations |
|---|---|
| .L unit (.L1, .L2) | 32/40-bit arithmetic and compare operations |
| | 32-bit logical operations |
| | Leftmost 1 or 0 counting for 32 bits |
| | Normalization count for 32 and 40 bits |
| | Byte shifts |
| | Data packing/unpacking |
| | 5-bit constant generation |
| | Paired 16-bit arithmetic operations |
| | Quad 8-bit arithmetic operations |
| | Paired 16-bit min/max operations |
| | Quad 8-bit min/max operations |
| .S unit (.S1, .S2) | 32-bit arithmetic operations |
| | 32/40-bit shifts and 32-bit bit-field operations |
| | 32-bit logical operations |
| | Branches |
| | Constant generation |
| | Register transfers to/from control register file (.S2 only) |
| | Byte shifts |
| | Data packing/unpacking |
| | Paired 16-bit compare operations |
| | Quad 8-bit compare operations |
| | Paired 16-bit shift operations |
| | Paired 16-bit saturated arithmetic operations |
| | Quad 8-bit saturated arithmetic operations |
| .M unit (.M1, .M2) | 16 × 16 multiply operations |
| | 16 × 32 multiply operations |
| | Bit expansion |
| | Bit interleaving/de-interleaving |
| | Quad 8 × 8 multiply operations |
| | Paired 16 × 16 multiply operations |
| | Paired 16 × 16 multiply with add/subtract operations |
| | Quad 8 × 8 multiply with add operations |
| | Variable shift operations |
| | Rotation |
| | Galois Field Multiply |
| .D unit (.D1, .D2) | 32-bit add, subtract, linear and circular address calculation |
| | Loads and stores with 5-bit constant offset |
| | Loads and stores with 15-bit constant offset (.D2 only) |
| | Load and store double words with 5-bit constant |
| | Load and store non-aligned words and double words |
| | 5-bit constant generation |
| | 32-bit logical operations |

Most data lines in the CPU support 32-bit operands, and some support long (40-bit) and double word (64-bit) operands. Each functional unit has its own 32-bit write port into a general-purpose register file 20*a* or 20*b* (Refer to FIG. 2). All units ending in 1 (for example, .L1) write to register file A 20*a* and all units ending in 2 write to register file B 20*b*. Each functional unit has two 32-bit read ports for source operands src1 and src2. Four units (.L1, .L2, .S1, and .S2) have an extra 8-bit-wide port for 40-bit long writes, as well as an 8-bit input for 40-bit long reads. Because each unit has its own 32-bit write port, when performing 32-bit operations all eight units can be used in parallel every cycle. Since each multiplier can return up to a 64-bit result, two write ports (dst1 and dst2) are provided from the multipliers to the respective register file.

Register File Cross Paths

Each functional unit reads directly from and writes directly to the register file within its own data path. That is, the .L1 unit 18*a*, .S1 unit 16*a*, .D1 unit 12*a*, and .M1 unit 14*a* write to register file A 20*a* and the .L2 unit 18*b*, .S2 unit 16*b*, .D2 unit 12*b*, and .M2 unit 14*b* write to register file B 20*b*. The register files are connected to the opposite-side register file's functional units via cross-path circuitry 250*a*, 250*b*. These cross paths allow functional units from one data path to access a 32-bit operand from the opposite side's register file. There is a single cross-path bus 210b to deliver register file A operands to functional units on the 2 side. This is termed the 2X cross-path and is connected to port 2X on register file 20a. Similarly, there is a single cross-path bus 210a to deliver B register file operands to functional units on the 1 side. This is termed the 1X cross path and is connected to port 1X on register file 20b. The 1X cross path allows data path A's functional units to read their source from register file B. Similarly, the 2X cross path allows data path B's functional units to read their source from register file A.

All eight of the functional units have access to the opposite side's register file via a cross path. The .M1, .M2, .S1, .S2, .D1, and .D2 units' src2 inputs are selectable between the cross path and the same side register file by appropriate selection of multiplexers 213–215, for example. On units .L1 and .L2, depending on the particular opcode, either the src1 or the src2 input, but not both simultaneously, is selectable between the cross path and the same-side register file by appropriate selection of multiplexers 211–212, for example. Cross path 1X bus 210 couples one input of multiplexer 211 for src1 input of .L1 unit 18a multiplexer 212 for src2 input of .L1 unit 18a, multiplexer 213 for src2 input of .S1 unit 16a and multiplexer 214 for scr2 input of .M1 unit 14a. Multiplexers 211, 213 and 214 select between the cross path 1X bus 210 and an output of register file A 20a. Buffer 250 buffers cross path 2X output to similar multiplexers for .L2, .S2, .M2, and .D2 units.

S2 unit 16b may write to control register file 102 from its dst output via bus 220. S2 unit 16b may read from control register file 102 to its src2 input via bus 221.

Figure 3A:
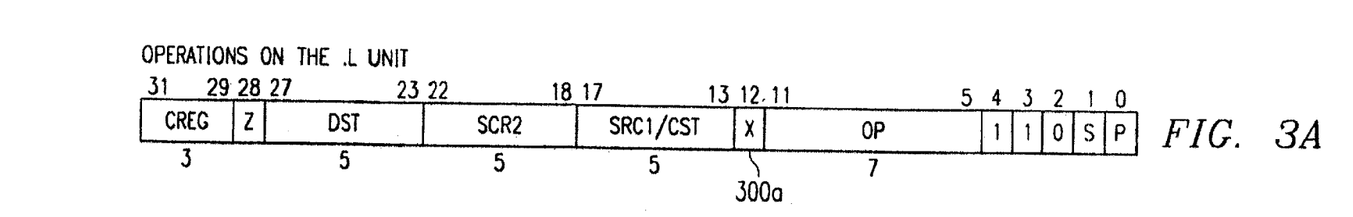
FIGS. 3A–3B show example instruction formats illustrating the cross-path selection bit for the DSP of FIG. 1.
Figure 3B:
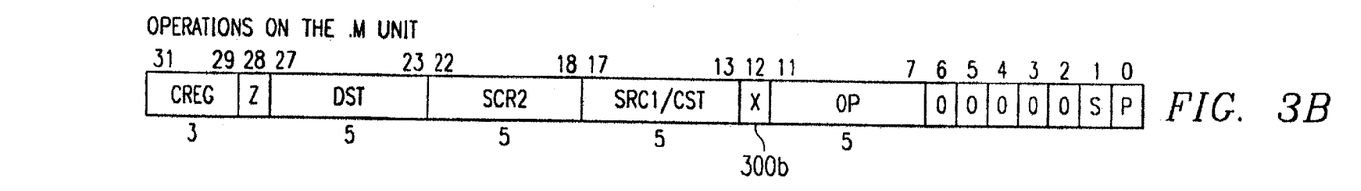

FIGS. 3A illustrate an instruction format for operations on the L functional units, while FIG. 3B illustrates an instruction format for operations on the M functional units. For example, the .L1 unit can read both its operands from the A register file; or it can read an operand from the B register file using the 1X cross path and the other from the A register file. The use of a cross path is denoted by an X following the functional unit name in the instruction syntax, for example: L1X. When an operand comes from a register file opposite of the destination register, the x bit 300a, 300b in the instruction field is set. Similar instruction formats are provided for the S and D functional units.

Figure 4:
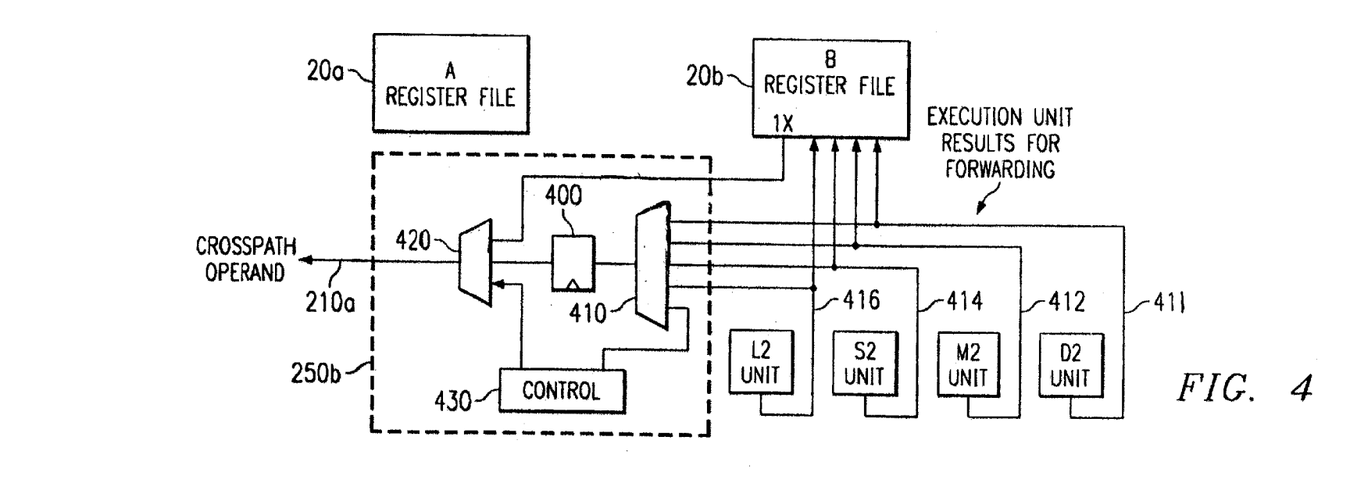
FIG. 4 is a block diagram illustrating cross-path circuitry of FIG. 2 in more detail.

FIG. 4 is a block diagram illustrating cross-path circuitry 250b of FIG. 2 in more detail. Cross-path circuitry 250a is embodied in a similar manner. The processor of the present embodiment introduces a delay clock cycle whenever an instruction attempts to read a register via a cross path that was updated in the previous cycle. This is known as a cross path stall.

In order to minimize the time period of a CPU cycle, the cross paths between the two register files go via registers from execution units to the other datapath via cross-path circuitry 250a, 250b. These registers introduce a pipeline delay. Because of this delay, if the cross path uses a result produced in the previous cycle, a pipeline stall is automatically inserted. During the stall cycle, no results are produced, so performance is reduced. This stall is inserted automatically by the hardware so that a NOP (no operation) instruction is not needed. However, in this embodiment, a stall is not introduced if the register being read is the destination for data loaded by a LDx instruction. Likewise, no stall is needed if an instruction reads a result at least one cycle after the result is generated.

Referring again to FIG. 4, cross path circuitry 250b includes a stall register 400 to receive operand data from any of functional units L2, S2, M2, or D2 through lines 416 414, 412, and 411, respectively, in parallel with register set 20b. Multiplexer 410 selects which functional unit is providing an operand that is being provided by the cross-path bus 210a to one of functional units L1, S1, M1 and/or D1. Multiplexer 420 is controlled by control circuitry 430 responsive to instruction decode circuitry 10c (FIG. 1) to select an input from the appropriate functional unit that is producing the required operand. Multiplexer 420 is operable to provide an operand selected from a register in register set 20b if the operand is not being stored into the register during a given CPU cycle, or to provide the operand from stall register 400 if the operand is being stored into the register during the given CPU cycle. The instruction execution pipeline is stalled for one CPU cycle when the operand is provided from the stall register 400, but not when the operand is provided directly from register set 20b via port 1X.

Figure 5:
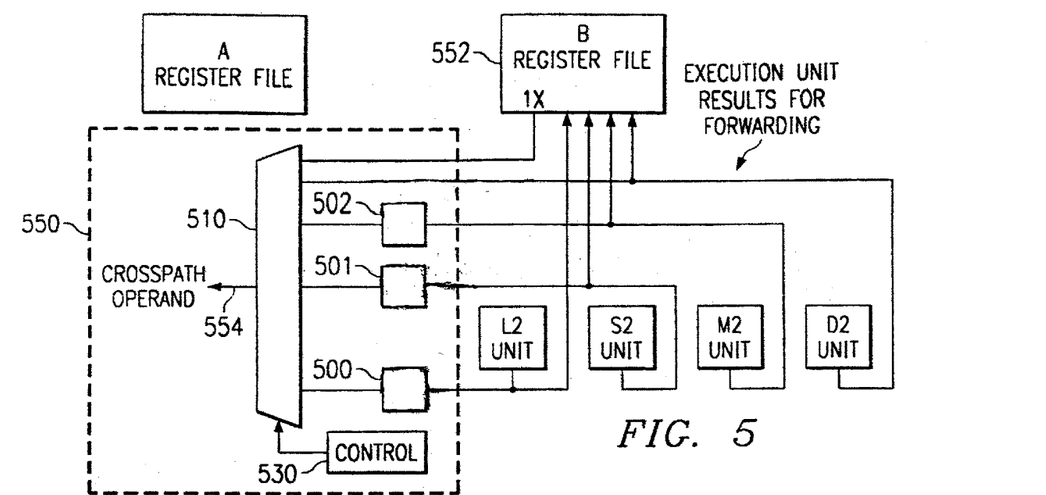
FIG. 5 is a block diagram illustrating another embodiment of cross-path circuitry in more detail.

FIG. 5 is a block diagram illustrating another embodiment of cross-path circuitry 550 in more detail. Stall registers 500–502 are connected respectively to functional units L2, S2 and M2 to receive operand data from each of the functional units in parallel with register set 552. Multiplexer 510 is operable to provide an operand selected from a register in register set 552 if the operand is not being stored into the register during a given CPU cycle, or to provide the operand from one of stall registers 500–502 if the operand is being stored into the register during the given CPU cycle. The instruction execution pipeline is stalled for one CPU cycle when the operand is provided from the stall registers, but not when the operand is provided directly from register set 552 via port 1X. Multiplexer 510 is controlled by control circuitry 530 responsive to instruction decode circuitry to select an input from the stall register associated with the appropriate functional unit that is producing the required operand. Multiplexer 510 outputs the operand from the appropriate stall register to cross-path operand bus 554. In this embodiment L, S, and M have the cross-path registers for all results. The D units have cross-path registers (not shown) on all results except load instruction results; load instruction results do not invoke a cross-path stall.

Only two cross paths, 1X and 2X, exist in this embodiment of the architecture. Thus the limit is one source read from each data path's opposite register file per cycle, or a total of two cross-path source reads per cycle. Advantageously, multiple units on a side may read the same cross-path source simultaneously. Thus the cross path operand for one side may be used by any one, multiple, or all the functional units on that side in a given execute packet. In another embodiment of the present invention, a different number of cross paths may be included.

Since there are the only two cross paths available, two instructions that would use a particular cross path between register files for different operands cannot be issued in the same execute packet because each cross path, 2X or 1X, can deliver just one operand per CPU cycle. Table 3 illustrates various valid and invalid execute packets.

TABLE 3

Cross Path Usage Examples

| Execute packet | Validity |
| --- | --- |
| ADD .L1X A0,B1,A1; <br> ‖ MPY .M1X A4,B4,A5 | Invalid: 1X cross path is used with two different operands (B1 and B4) |
| ADD .L1X A0,B1,A1 <br> ‖ MPY .M2X B4,A4,B2 | Valid: Instructions use the 1X and 2X cross paths |
| ADD .L1X A0,B1,A1 <br> ‖ SUB .S1X A2,B1,A2 | Valid: Instructions use the 1X with B1 1X cross paths using B1 |

TABLE 3-continued

Cross Path Usage Examples

| Execute packet | Validity |
|---|---|
| ‖ AND .D1X A4,B1,A3 | 1X cross paths using B1 |
| ‖ MPY .M1X A6,B1,A4 | 1X cross paths using B1 |
| ‖ ADD .L2X B0,A4,B2 | 2X cross paths using A4 |
| ‖ SUB .S2X B4,A4,B3 | 2X cross paths using A4 |
| ‖ AND .D2X B5,A4,B4 | 2X cross paths using A4 |
| ‖ MPY .M2X B6,A4,B5 | 2X cross paths using A4 |

Table 4 presents several example execution packet sequences that each produce a pipeline stall because a result produced in a given CPU cycle is used on a cross path in the next execute packet on the immediately following CPU cycle.

TABLE 4

Examples of Instruction Sequences
That Result in a Cross-Path Stall

| Execute packet sequence | Reason for stall |
|---|---|
| ADD .L1 A1,A2,A1 ‖ AND .S2 B4,B7,B1 | Uses B1 produced by previous execute packet |
| ADD .L1X A0,B1,A2 ‖ MPY .M2 B4,B5,B2 | |
| ADD .L1 A1,A2,A5 ‖ AND .S2 B4,B7,B1 | Uses A5 produced by previous execute packet |
| ADD .L1 A0,A1,A2 ‖ MPY .M2X B4,A5,B2 | |
| LDW .D1 *++A0[1],B0 | Uses A0 produced by previous execute packet |
| ADD .L1 A0,A1,A2 ‖ MPY .M2X B4,A0,B2 | |
| LDW .D1 *++A0[1],A1 | A0 is updated 1 cycle before it is used as a cross path source |
| ADD .S2X A0, B0, B1 | |

Table 5 presents several example execution packet sequences that do not produce a pipeline stall because the result used on a cross-path was not stored in the register file on the immediately preceding CPU cycle.

TABLE 5

Examples of Instruction Sequences
That Do Not Result in a Cross-Path Stall

| Execute packet sequence | explanation |
|---|---|
| ADD .L1 A1,A2,A1 ‖ AND .S2 B4,B7,B1 | Uses B5, available immediately |
| ADD .L1X A0,B5,A2 ‖ MPY .M2 B4,B5,B2 | |

TABLE 5-continued

Examples of Instruction Sequences
That Do Not Result in a Cross-Path Stall

| Execute packet sequence | explanation |
|---|---|
| ADD .L1 A1,A2,A5 ‖ AND .S2 B4,B7,B1 | Uses A6, available immediately |
| ADD .L1 A0,A1,A2 ‖ MPY .M2X B4,A6,B2 | |
| LDB .D2 *+B14[36], B5 | Wait for load to complete |
| NOP 4 | No stall because X-path source is from the load result bus |
| ADD .L1X A0,B5,A2 ‖ MPY .M2 B4,B5,B2 | |

It is possible to avoid the cross path stall by scheduling an instruction that reads an operand via the cross path at least one cycle after the operand is updated. With appropriate scheduling, the processor can provide one cross path operand per data path per cycle with no stalls. In many cases, an Optimizing C Compiler and Assembly Optimizer can automatically perform this scheduling.

Pipeline Operation

Figure 6:
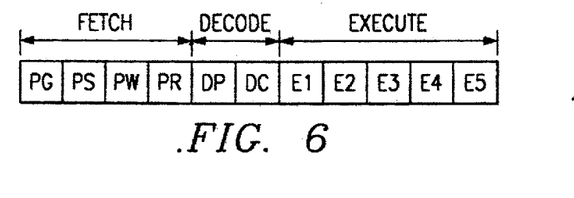
FIG. 6 illustrates the phases of the instruction execution pipeline of the DSP of FIG. 1.

FIG. 6 illustrates the phases of the pipeline of the DSP of FIG. 1. There are no internal interlocks in the execution cycles of the pipeline, so a new execute packet enters execution every CPU cycle. Therefore, the number of CPU cycles for a particular algorithm with particular input data is fixed. If during program execution, there are no memory stalls, the number of CPU cycles equals the number of clock cycles for a program to execute.

Performance can be inhibited only by stalls from the memory subsystems or interrupts. The reasons for memory stalls are determined by the memory architecture. To fully understand how to optimize a program for speed, the sequence of program fetch, data store, and data load requests the program makes, and how they might stall the CPU should be understood.

The pipeline operation, from a functional point of view, is based on CPU cycles. A CPU cycle is the period during which a particular execute packet is in a particular pipeline stage. CPU cycle boundaries always occur at clock cycle boundaries; however, memory stalls can cause CPU cycles to extend over multiple clock cycles. To understand the machine state at CPU cycle boundaries, one must be concerned only with the execution phases (E1–E5) of the pipeline. The phases of the pipeline are shown in FIG. 6 and described in Table 6.

TABLE 6

Pipeline Phase Description

| Pipeline | Pipeline Phase | Symbol | During This Phase | Instruction Types Completed |
|---|---|---|---|---|
| Program Fetch | Program Address Generate | PG | Address of the fetch packet is determined. | |
| | Program Address Send | PS | Address of fetch packet is sent to memory. | |
| | Program Wait | PW | Program memory access is performed. | |
| | Program Data Receive | PR | Fetch packet is expected at CPU boundary. | |
| Program Decode | Dispatch | DP | Next execute packet in fetch packet determined and sent to the appropriate functional units to be decoded. | |
| | Decode | DC | Instructions are decoded at functional units. | |

TABLE 6-continued

Pipeline Phase Description

| Pipeline | Pipeline Phase | Symbol | During This Phase | Instruction Types Completed |
|---|---|---|---|---|
| Execute | Execute 1 | E1 | For all instruction types, conditions for instructions are evaluated and operands read. Load and store instructions: address generation is computed and address modifications written to register file† Branch instructions: affects branch fetch packet in PG phase† Single-cycle instructions: results are written to a register file† | Single-cycle |
|  | Execute 2 | E2 | Load instructions: address is sent to memory† Store instructions and STP: address and data are sent to memory† Single-cycle instructions that saturate results set the SAT bit in the Control Status Register (CSR) if saturation occurs. Multiply instructions: results are written to a register file† | Stores STP Multiplies |
|  | Execute 3 | E3 | Data memory accesses are performed. Any multiply instruction that saturates results sets the SAT bit in the Control Status Register (CSR) if saturation occurs.† |  |
|  | Execute 4 | E4 | Load instructions: data is brought to CPU boundary† |  |
|  | Execute 5 | E5 | Load instructions: data is loaded into register† | Loads |

†This assumes that the conditions for the instructions are evaluated as true. If the condition is evaluated as false, the instruction will not write any results or have any pipeline operation after E1.

The pipeline operation of the instructions can be categorized into seven types shown in Table 7. The delay slots for each instruction type are listed in the second column.

TABLE 7

Delay Slot Summary

| Instruction Type | Delay Slots | Execute Stages Used |
|---|---|---|
| Branch (The cycle when the target enters E1) | 5 | E1-branch target E1 |
| Load (LD) (Incoming Data) | 4 | E1–E5 |
| Load (LD) (Address Modification) | 0 | E1 |
| Multiply | 1 | E1–E2 |
| Single-cycle | 0 | E1 |
| Store | 0 | E1 |
| NOP (no execution pipeline operation) | — | — |
| STP (no CPU internal results written) | — | — |

The execution of instructions can be defined in terms of delay slots (Table 7). A delay slot is a CPU cycle that occurs after the first execution phase (E1) of an instruction in which results from the instruction are not available. For example, a multiply instruction has 1 delay slot, this means that there is 1 CPU cycle before another instruction can use the results from the multiply instruction.

Single cycle instructions execute during the E1 phase of the pipeline. The operand is read, operation is performed and the results are written to a register all during E1. These instructions have no delay slots.

Multiply instructions complete their operations during the E2 phase of the pipeline. In the E1 phase, the operand is read and the multiply begins. In the E2 phase, the multiply finishes, and the result is written to the destination (dst) register. Multiply instructions have 1 delay slot.

Load instructions have two results: data loaded from memory and address pointer modification.

Data loads complete their operations during the E5 phase of the pipeline. In the E1 phase, the address of the data is computed. In the E2 phase, the data address is sent to data memory. In the E3 phase, a memory read is performed. In the E4 stage, the data is received at the CPU core boundary. Finally, in the E5 phase, the data is loaded into a register. Because data is not written to the register until E5, these instructions have 4 delay slots. Because pointer results are written to the register in E1, there are no delay slots associated with the address modification.

Store instructions complete their operations during the E3 phase of the pipeline. In the E1 phase, the address of the data is computed. In the E2 phase, the data address is sent to data memory. In the E3 phase, a memory write is performed. The address modification is performed in the E1 stage of the pipeline. Even though stores finish their execution in the E3 phase of the pipeline, they have no delay slots.

Branch instructions execute during the E1 phase of the pipeline five delay slots/CPU cycles after the branch instruction enters an initial E1 phase of the pipeline.

Figure 7:
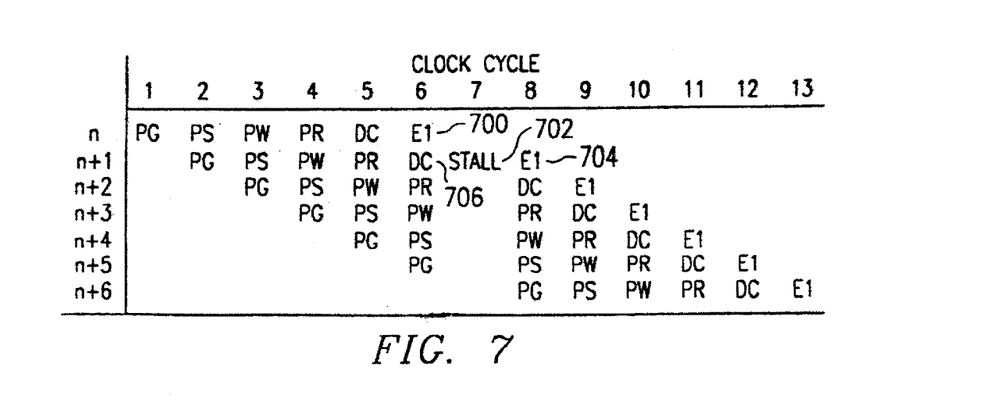
FIG. 7 is a timing diagram illustrating the operation of the pipeline of the DSP of FIG. 1 based on clock cycles and fetch packets during a cross-path-stall, according to an aspect of the present invention.

FIG. 7 is a timing diagram illustrating the operation of the pipeline of the DSP of FIG. 1 based on clock cycles and fetch packets during a cross-path-stall, according to an aspect of the present invention. In FIG. 7, for simplicity, only one execute phase is shown for each execute packet; however, as discussed above various instructions will require more than one execute phase and up to eight instructions may be executing in parallel within each execution packet. For purposes of cross-path stall, only the final execute phase of each execute packet need be considered.

In FIG. 7, execute packet n may be an instruction such as: ADD S1 A0, A2, A1, for example. This instruction uses functional unit S1, and adds the contents of register A0 to the contents of register A2 and stores the resulting operand in register A1. Execute packet n+1 may be an instruction such as: ADD S2X A1, B0, B1, for example. This instruction uses the adds functional unit S2 and adds the contents of register A1 to the contents of register B0 and stores the result in register B1. In this case, the operand selected from register A1 is provided via the cross-path circuitry, as indicated by an "X" after S2.

Referring again to FIG. 7, clock cycle 6 is the execute phase for instruction packet n, indicated at 700. During this CPU cycle, register A0 and A2 are accessed for source operands by functional unit S1 and the resulting sum is stored as a destination operand in register A1. Clock cycle 7 would normally be the execute phase for instruction packet n+1; however, instruction packet n+1 is accessing a cross-path operand from register A1 on the CPU cycle immediately following the CPU cycle in which register A1 is updated. As discussed earlier, in order to minimize the length of the CPU cycle, there is not enough time to store an operand in a selected register in the register set associated with functional unit S1 during CPU cycle 6 and then to access the same register during the immediately following CPU cycle 7 and to provide this operand to the other data path in which functional unit S2 is located. Thus, a stall is conditionally inserted into the instruction processing pipeline, as indicated at 702.

Stall 702 allows sufficient time for the selected operand to be provided to the S2 functional unit via the cross-path circuitry. After the stall cycle, the execute phase of execute packet n+1 is completed at 704. Instruction decoding performed in decode phase 706 of instruction packet n+1 determines if the register selected for a cross-path operand source operand is being updated on the immediately preceding CPU cycle by execute phase 700 of instruction packet n. A cross-path stall is inserted only if this condition is true.

Referring again to FIG. 4 and FIG. 5, multiplexer 410 or 510 in the cross-path circuitry is controlled in response to instruction decoding performed in decode phase 706 of instruction packet n+1. If a cross-path stall is inserted, then the multiplexer selects the cross-path operand from the appropriate stall register; otherwise, the multiplexer selects the cross-path operand from the cross-path port of the register set.

Figure 8:
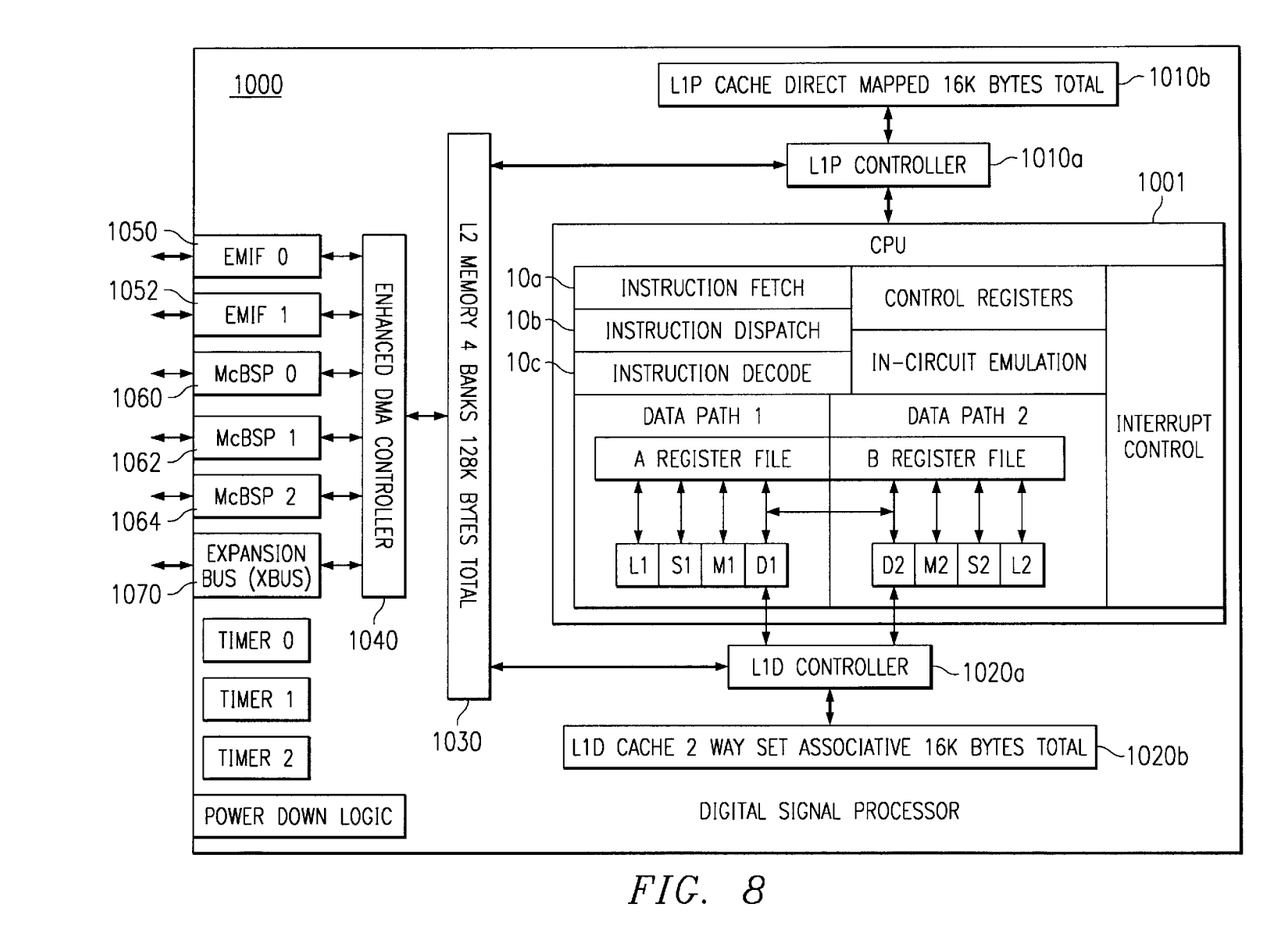
FIG. 8 is a block diagram of an alternative embodiment of the processor of FIG. 1.

FIG. 8 is a block diagram of an alternative embodiment of a digital system 1000 with processor core 1001. A direct mapped program cache 1010b, having 16 kbytes capacity, is controlled by L1 Program (LIP) controller 1010a and connected thereby to the instruction fetch stage 10a. A 2-way set associative data cache 1020b, having a 16 kbyte capacity, is controlled by L1 Data (LID) controller 1020a and connected thereby to data units D1 and D2. An L2 memory 1030 having four banks of memory, 128 kbytes total, is connected to L1P 1010a and to L1D 1020a to provide storage for data and programs. External memory interface (EMIF) 1050 provides a 64 bit data path to external memory, not shown, which provides memory data to L2 memory 1030 via extended direct memory access (DMA) controller 1040.

EMIF 1052 provides a 16 bit interface for access to external peripherals, not shown. Expansion bus 1070 provides host and I/O support similarly to host port 60/80 of FIG. 1.

Three multi-channel buffered serial ports (McBSP) 1060, 1062, 1064 are connected to DMA controller 1040. A detailed description of a McBSP is provided in U.S. Pat. No. 6,167,466 and is incorporated herein by reference.

Other Systems

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

Figure 9:
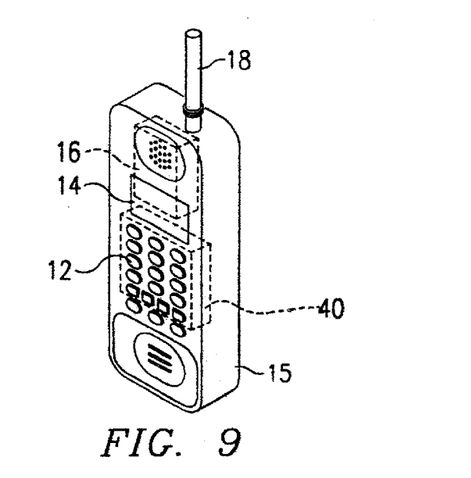
FIG. 9 illustrates an exemplary implementation of a digital system that includes an embodiment of the present invention in a mobile telecommunications device.

FIG. 9 illustrates an exemplary implementation of an example of an integrated circuit that includes digital system 40 in a mobile telecommunications device 15, such as a wireless telephone with integrated keyboard 12 and display 14. As shown in FIG. 9 digital system 40 with processor (not shown) is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18. Advantageously, by allowing conditional insertion of cross-path stalls, the CPU cycle time can be reduced and operating frequency increased to satisfy the demand for enhanced wireless telephony functionality.

Fabrication of digital system 1, 1000 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

Thus, a digital system is provided with a processor having an improved instruction set architecture. The processor is code-compatible with C62xx DSP processors from Texas Instruments Incorporated. It provides a superset of the C62x architecture while providing complete code compatibility for existing C62x code. The processor provides extensions to the existing C62x architecture in several areas: register file enhancements, data path extensions, additional functional unit hardware, increased orthogonality of the instruction set, data flow enhancements/8-bit and 16-bit extensions, and additional instructions that reduce code size and increase register flexibility. Advantageously, CPU cycle time is reduced; a conditional cross-path stall is inserted as needed to allow cross-path operands to be delivered while maintaining full instruction execution compatibility with prior members of the processor family.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, additional cross-paths may be provided. A different number of functional units may be provided. More than two data path sets may be provided. It is therefore contemplated that the appended claims will cover any such modifications of the embodiments as fall within the true scope and spirit of the invention.

What is claimed is:

1. A digital system comprising a central processing unit (CPU) having an instruction execution pipeline with a plurality of functional units for executing instructions in a sequence of CPU cycles, the CPU comprising:

a first functional unit interconnected with a first set of registers, the first functional unit operable to exchange operand data with the first set of registers;

a second functional unit interconnected with a second set of registers, the second functional unit operable to exchange operand data with the second set of registers, wherein a write to said first and second sets of registers is performed over multiple pipeline cycles;

first cross-path circuitry connected to an input of the second functional unit and to a port on the first set of registers, the cross-path circuitry being operable to access the first set of registers for providing operand data from the first set of registers to the second functional unit;

wherein the cross-path circuitry is operable to stall both the first functional unit and the second functional unit in response to accessing a selected register in the first register set during a given CPU cycle if the selected register is being updated by the first functional unit;

wherein the first cross-path circuitry comprises a first stall register connected to receive operand data from the first functional unit in parallel with the first set of registers; and wherein to minimize CPU cycle time length, the first cross-path circuitry is operable to provide a first operand from the first stall register during a given CPU cycle if the first operand was being stored into the selected register of the first register set during the mediately prior CPU cycle, such that the instruction execution pipeline is stalled for one CPU cycle when the first operand is provided from the first stall register.

2. The CPU of claim 1, wherein during a given CPU cycle the first cross-path circuitry is operable to provide the first operand from the selected register if the first operand was not stored into the selected register during a CPU cycle immediately prior to the given CPU cycle.

3. A CPU of claim 1, further comprising:

a fist plurality of functional units interconnected with the first set of registers; and wherein the first cross-path circuitry further comprises a first plurality of stall registers connected respectively to the first plurality of functional units to receive operand data from each of the first plurality of functional units in parallel with the first set of registers.

4. The CPU of claim 1, further comprising:

a first plurality of functional units interconnected with the first set of registers; and wherein the cross-path circuitry further comprises multiplexer circuitry having an output connected to the stall register, with a plurality of inputs connected respectively to the first plurality of functional units.

5. The digital of claim 1, wherein the CPU is a very long instruction word (VLIW) CPU, further comprising an instruction memory and a data memory.

6. The digital system of claim 5, wherein the CPU is a digital signal processor and wherein the first functional unit and the second functional unit are multiply-accumulate units.

7. The digital system of claim 1 being a cellular telephone, further comprising:

an integrated keyboard connected to the CPU via a keyboard adapter;

a display, connected to the CPU via a display adapter;

radio frequency (R) circuitry connected to the CPU; and an aerial connected to the RF circuitry.

8. A method of operating a CPU having an instruction execution pipeline with a plurality of functional units for executing instructions in a sequence of CPU cycles, the method comprising the steps of:

exchanging operands between a first functional unit and a first set of registers associated with the first functional unit;

exchanging operands between a second functional unit and a second set of registers associated with the second functional unit, wherein a write to said first and second sets of registers is performed over multiple pipeline cycles;

storing a operand in a stall resister in parallel with a selected register of the first set of registers if the selected register was undated an immediately prior CPU cycle; and accessing the operand from the selected register of the first set of registers for use by the second functional unit during a given CPU cycle, wherein the step of accessing comprises the steps of:

determining if the selected register was updated during a CPU cycle immediately prior to the given CPU cycle;

stalling both the first functional unit and the second functional unit in response to accessing the selected register in the first register set during the given CPU cycle if the selected register is updated by the first functional unit during the given CPU cycle; and obtaining the operand from the stall register if the selected register was updated during the immediately prior CPU cycle, wherein the instruction execution pipeline is stalled for one CPU cycle when the operand is obtained from the stall register to minimize CPU cycle time length.

9. The method of claim 8, further comprising the steps of:

obtaining the operand directly from the selected register if the selected register was not updated during the immediately prior CPU cycle.

10. A method of operating a CPU having an instruction execution pipeline with a plurality of functional units for executing instructions in a sequence of CPU cycles, the method comprising the steps of:

exchanging operands between a first functional unit and a first set of registers associated with the first functional unit;

exchanging operands between a second functional unit and a second set of registers associated with the second functional unit, wherein a write to said first and second sets of registers is performed over multiple pipeline cycles;

storing a plurality of operands in a plurality of stall registers in parallel with selected registers of the first set of registers; and accessing an operand from one of the selected registers of the first set of registers for use by the second functional unit during a given CPU cycle, wherein the step of accessing comprises the steps of:

determining if the one of the selected registers was updated during a CPU cycle immediately prior to the given CPU cycle;

stalling both the first functional unit and the second functional unit in response to accessing the one of the selected registers in the first register set during the given CPU cycle if the one of the selected registers is updated by the first functional unit during the given CPU cycle; and obtaining one of the plurality of operands from a stall register selected from the plurality of stall registers if the one of the selected registers was updated during the immediately prior CPU cycle, wherein the instruction execution pipeline is stalled for one CPU cycle when the operand is obtained from the stall register to minimize CPU cycle time length.

11. The method of claim 10, further comprising the steps of:

obtaining the operand directly from the one of the selected registers if the one of the selected registers was not updated during the immediately prior CPU cycle.

* * * * *